US012761923B2

(12) United States Patent
Vasekin et al.

(10) Patent No.: US 12,761,923 B2
(45) Date of Patent: Oct. 13, 2026

(54) PIPELINE STAGE ALLOCATION

(71) Applicant: Arm Limited, Cambridge (GB)

(72) Inventors: Vladimir Vasekin, Cambridge (GB); Chiloda Ashan Senarath Pathirane, Cambourne (GB); David Michael Bull, Cambridge (GB); Hung Thinh Pham, Cambridge (GB)

(73) Assignee: Arm Limited, Cambridge (GB)

( * ) Notice: Subject to any disclaimer, the term of this patent is extended or adjusted under 35 U.S.C. 154(b) by 30 days.

(21) Appl. No.: 18/932,968

(22) Filed: Oct. 31, 2024

(65) Prior Publication Data

US 2026/0119181 A1 Apr. 30, 2026

(51) Int. Cl.
*G06F 9/30* (2018.01)
*G06F 9/38* (2018.01)
*G06F 15/78* (2006.01)

(52) U.S. Cl.
CPC ........ *G06F 9/3873* (2013.01); *G06F 15/7867* (2013.01); *G06F 9/3867* (2013.01)

(58) Field of Classification Search
CPC ... G06F 9/3873; G06F 15/7867; G06F 9/3867
See application file for complete search history.

(56) References Cited

U.S. PATENT DOCUMENTS

| | | | | |
|---|---|---|---|---|
| 4,736,288 A * | 4/1988 | Shintani | G06F 15/8092 | 712/217 |
| 5,542,059 A * | 7/1996 | Blomgren | G06F 9/30196 | 712/E9.035 |
| 6,138,230 A * | 10/2000 | Hervin | G06F 9/3867 | 712/216 |
| 6,408,377 B2 * | 6/2002 | Munson | G06F 9/3885 | 712/E9.046 |
| 7,814,300 B2 * | 10/2010 | Moyer | G06F 9/3861 | 712/225 |
| 2004/0019765 A1 * | 1/2004 | Klein, Jr. | G06F 15/7867 | 712/15 |
| 2009/0292907 A1 * | 11/2009 | Schwinn | G06F 1/3296 | 712/229 |

* cited by examiner

*Primary Examiner* — Corey S Faherty
(74) *Attorney, Agent, or Firm* — NIXON & VANDERHYE P.C.

(57) ABSTRACT

An apparatus comprises processing circuitry comprising a plurality of execution units; issue circuitry to issue an instruction to be executed by the processing circuitry during a plurality of pipeline stages such that younger instructions are not permitted to be issued before older instructions and scheduling circuitry to schedule instructions for execution in a given cycle during the plurality of pipeline stages, such that the instruction is permitted to be executed in an order different to a program order in response to input operand data being available, by dynamically allocating which of the plurality of pipeline stages a given execution unit of the plurality of execution units is assigned to in the given cycle. In a configuration selectable for the given cycle, the scheduling circuitry causes the given execution unit of the plurality of execution units to be assigned to any pipeline stage of the plurality of pipeline stages.

20 Claims, 9 Drawing Sheets

PIPELINE STAGE ALLOCATION

BACKGROUND

Technical Field

The present technique relates to the field of data processing, and in particular to scheduling data processing instructions.

Technical Background

Data processing devices may receive program instructions in an order corresponding to program order. To take advantage of cases where a younger instruction may be independent of an older instruction in program order which is stalled awaiting availability of operands, out-of-order issue may be supported such that a younger instruction is capable of bypassing an older instruction to allow the younger instruction to be issued for execution earlier than the older instruction. However, the additional logic and power requirements to support out-of-order issue may not be justified for some implementations.

SUMMARY

At least some examples of the present technique provide an apparatus comprising: processing circuitry comprising a plurality of execution units; issue circuitry configured to issue an instruction to be executed by the processing circuitry during a plurality of pipeline stages such that younger instructions are not permitted to be issued before older instructions; and scheduling circuitry configured to schedule instructions to be executed in a given cycle during the plurality of pipeline stages, such that the instruction is permitted to be executed in an order different to a program order in response to input operand data being available, by dynamically allocating which of the plurality of pipeline stages a given execution unit of the plurality of execution units is assigned to in the given cycle, wherein: in a first configuration selectable for the given cycle, the scheduling circuitry is configured to cause the given execution unit of the plurality of execution units to be assigned to a first pipeline stage of the plurality of pipeline stages; and in a second configuration selectable for the given cycle, the scheduling circuitry is configured to cause the given execution unit to be assigned to a second pipeline stage of the plurality of pipeline stages.

At least some examples of the present technique provide a system comprising: the apparatus as described above, implemented in at least one packaged chip; at least one system component; and a board, wherein the at least one packaged chip and the at least one system component are assembled on the board.

At least some examples of the present technique provide a chip-containing product comprising the system described above, assembled on a further board with at least one other product component.

At least some examples of the present technique provide a method comprising: issuing an instruction to be executed during a plurality of pipeline stages such that younger instructions are not permitted to be issued before older instructions; and scheduling instructions to be executed in a given cycle during the plurality of pipeline stages, such that the instruction is permitted to be executed in an order different to a program order in response to respective input operand data being available, by dynamically allocating which of the plurality of pipeline stages a given execution unit of a plurality of execution units is assigned to in the given cycle, wherein: in a first configuration selectable for the given cycle, causing the given execution unit of the plurality of execution units to be assigned to a first pipeline stage of the plurality of pipeline stages; and in a second configuration selectable for the given cycle, causing the given execution unit to be assigned to a second pipeline stage of the plurality of pipeline stage.

A non-transitory computer-readable medium storing computer-readable code for fabrication of an apparatus comprising: processing circuitry comprising a plurality of execution units; issue circuitry configured to issue an instruction to be executed by the processing circuitry during a plurality of pipeline stages such that younger instructions are not permitted to be issued before older instructions; and scheduling circuitry configured to schedule instructions to be executed in a given cycle during the plurality of pipeline stages, such that the instruction is permitted to be executed in an order different to a program order in response to respective input operand data being available, by dynamically allocating which of the plurality of pipeline stages a given execution unit of the plurality of execution units is assigned to in a the given cycle, wherein: in a first configuration selectable for the given cycle, the scheduling circuitry is configured to cause the given execution unit of the plurality of execution units to be assigned to a first pipeline stage of the plurality of pipeline stages; and in a second configuration selectable for the given cycle, the scheduling circuitry is configured to cause the given execution unit to be assigned to a second pipeline stage of the plurality of pipeline stages.

Further aspects, features and advantages of the present technique will be apparent from the following description of examples, which is to be read in conjunction with the accompanying drawings.

DESCRIPTION OF EXAMPLES

Figure 1:
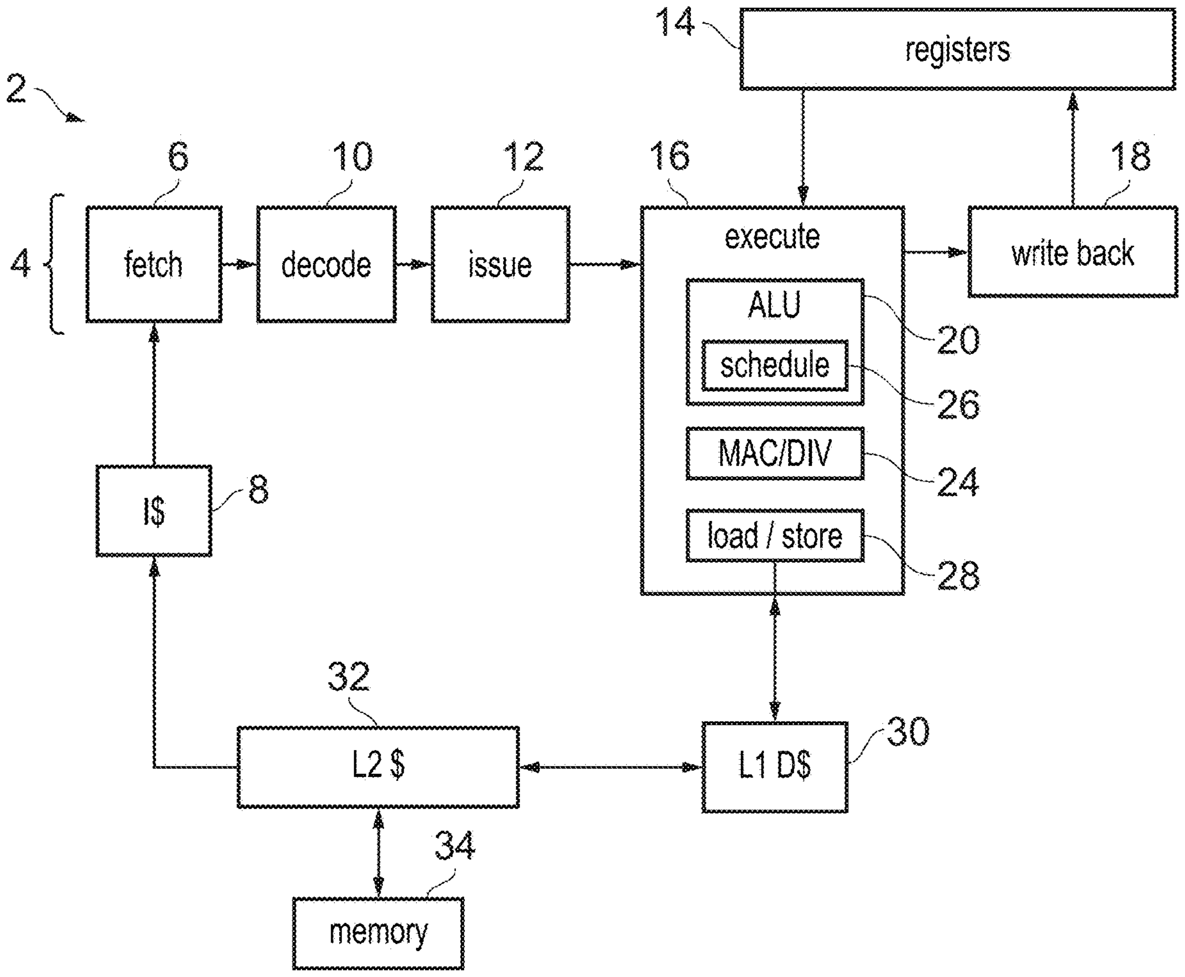
FIG. 1 illustrates an example of an apparatus comprising issue circuitry and scheduling circuitry.

In accordance with some example embodiments, there is provided an apparatus comprising processing circuitry comprising a plurality of execution units and issue circuitry configured to issue an instruction to be executed by the processing circuitry during a plurality of pipeline stages. The issue circuitry issues the instructions such that younger instructions are not permitted to be issued before older instructions. Each of the pipeline stages may correspond to a respective number of cycles after issue in which the instruction is actually executed. For example, in a series of four pipeline stages, an instruction may be executed at any point between the first pipeline stage (corresponding to one cycle after issue) and the fourth pipeline stage (corresponding to four cycles after issue). The issue circuitry may issue the instruction to be executed at any point during the pipeline stages or in a particular pipeline stage. Accordingly, one or more instructions may be "in-flight" (i.e. issued or partially executed, but not yet completed) throughout the plurality of pipeline stages. In the cycle corresponding to the pipeline stage at which an instruction is to be executed, one of the execution units in the processing circuitry executes the instruction (e.g. by performing one or more micro-operations).

In some approaches, the instructions may be both issued and executed according to the program order. A problem with these approaches is that input operand data for an instruction may be delayed due to, for example, latency in a memory system or a data dependency with an earlier instruction, which may then cause later instructions to be stalled until the input operand data is available. When instructions become stalled, fewer instructions are issued to the plurality of pipeline stages, causing several of the pipeline stages to go unused in any given cycle.

In the present techniques, while instruction issue is still in an order which does not permit a younger instruction to be issued before an older instruction, the apparatus is further provided with scheduling circuitry configured to schedule the instructions to be executed in a given cycle during the plurality of pipeline stages, such that the instruction is permitted to be executed in an order different to a program order in response to respective input operand data being available, by dynamically allocating which of the plurality of pipeline stages a given execution unit of the plurality of execution units is assigned to in the given cycle. In particular, in a first configuration selectable for the given cycle, the scheduling circuitry is configured to cause the given execution unit of the plurality of execution units to be assigned to a first pipeline stage of the plurality of pipeline stages; and in a second configuration selectable for the given cycle, the scheduling circuitry is configured to cause the given execution unit to be assigned to a second pipeline stage of the plurality of pipeline stages. By providing a flexible mapping of execution units to pipeline stages, the scheduling circuitry can re-assign an execution unit that would otherwise go unused such that it instead executes an additional instruction. Accordingly, the processing circuitry as a whole is capable of handling a larger number of in-flight instructions per execution unit. Since more in-flight instructions can be handled, the scheduling circuitry may further cause the instructions to be executed in an order that is different to the order in which the instructions are issued. For example, instructions that can be executed earlier can be executed while an older instruction is stalled (i.e. due to input operand data being unavailable), thereby allowing more issued instructions to proceed to execution sooner to reduce the number of idling execution units in a given cycle and improve performance. In these examples, the interplay between issuing instructions according to the program order and scheduling execution in a different order reduces the complexity in managing dependencies between instructions. In particular, the number of possible dependencies are limited by the number of issued instructions, thereby providing a fixed window in which re-ordering of execution can take place. Furthermore, in some examples, instructions that are issued to one pipeline may have already had any dependencies with other pipelines managed, i.e. by being issued in-order. Hence those dependencies do not need to be considered by the scheduling circuitry. This may be contrasted with fully out-of-order data processors in which an issue stage may hold long queues of instructions to identify larger-scale dependencies and manage out-of-order completion of instructions using a re-order buffer or similar structure.

In some examples, the issue circuitry may issue a plurality of instructions in parallel. Accordingly, younger instructions may be issued in the same cycle as older instructions, but younger instructions are still not permitted to be issued before the older instructions. This allows for still more instructions to proceed to execution by one of the execution units.

In some examples, the increase in the number of in-flight instructions that can be handled by the processing circuitry can be traded for implementing fewer execution units. Although this may result in pipeline stages without an assigned execution unit and hence unable to execute an instruction, the scheduling circuitry may dynamically allocate the execution units such that an execution unit is assigned for each pipeline stage in which execution is actually required, as opposed to where a pipeline stage would otherwise be idle (e.g. due to an instruction waiting for input operand data). In particular, where S represents a number of the plurality of pipeline stages and P represents a maximum number of instructions that the issue circuitry is configured to issue in a single cycle, then the plurality of execution units may comprise fewer than $S \times P$ execution units. Accordingly, the processing circuitry may be implemented using fewer execution units, thereby reducing the required circuit area and power consumption while still being capable of handling a sufficient number of in-flight instructions.

In some examples, the pipeline stages are arranged as a single pooled stage and the scheduling circuitry is configured to cause the instruction to be executed by the pooled stage in a given cycle based on a selected configuration. The pooled stage may be used to emulate a plurality of pipeline stages such that an instruction is executed by the pooled stage when the scheduling circuitry controls it to do so. This may be contrasted with an implementation having a series of fixed-hardware pipeline stages (without dynamic remapping of execution units as discussed above) where an instruction passes from one pipeline stage to the next pipeline stage in each cycle until it reaches the pipeline stage in which it was scheduled to be executed. Such examples therefore reduce the requirements for circuit area and power consumption of the processing circuitry.

In some examples, the processing circuitry comprises a set of storage elements configured to store input operands and output operands between each of the plurality of pipeline stages. Such input operands may form part of the input operand data for the instruction, as described above, but may also form part of the input operand data for a different instruction. In such examples, the input operands and the output operands may be (logically, if not necessary physically) passed from one pipeline stage to the next pipeline stage such that the input operand data for the instruction is available to the pipeline stage in which the instruction has been scheduled to be executed.

In some examples, the pooled stage is configured to read input operands and write output operands in the same set of storage elements in each cycle. As mentioned above, since the plurality of pipeline stages may be implemented with a pooled stage, the set of storage elements may be implemented to store both the input operands and the output operands. Accordingly, in operation the pooled stage may read the input operands from the set of storage elements, perform a data processing operation, and write the output operands to the same set of storage elements, for example via a "loop-back" data line such that the output from the execution units can be input into the execution units again in a subsequent cycle. Hence, when operands are "logically" passed from pipeline stage to pipeline stage, this may in some examples comprise the operands being held in the common set of storage elements of the pooled stage for multiple cycles until the cycle in which the pooled stage acts as a given pipeline stage in which a given instruction is to be processed.

In some examples, the set of storage elements is configured to selectively hold an operand for at least one cycle. This is useful when executing instructions using the single pooled stage because the storage elements may hold operands that are used as input operands for instructions that are scheduled to be executed one or more cycles in the future. For example, if the operand is used as an input operand for an instruction that has been scheduled for execution in three cycles'time, then the storage element may hold that operand unchanged for two cycles so that it is available in the third cycle in which the instruction is executed. Accordingly, this allows an operand to be input into the storage elements as soon as it is available and then held until it is needed. Such examples would be counterintuitive for a staged pipeline implementation, because the operands would typically be communicated along each stage of the pipeline for use in the pipeline stage in which the instruction had been scheduled for execution.

In some examples, the plurality of execution units are configured to perform a first class of instruction; and the processing circuitry comprises at least one execution pipeline configured to perform a second class of instruction. Differing classes of instruction may be defined in various ways, for example by the particular type of execution unit that is used for executing the instruction (e.g. an arithmetic logic unit, a floating-point unit, a load/store unit, etc). The different classes of instructions may therefore be handled by different execution pipelines. Accordingly, the plurality of execution units that are dynamically allocable as described above may be part of an execution pipeline for the first class of instruction, whereas other execution pipelines for another class of instruction may be configured differently.

In some examples, the issue circuitry is configured to issue instructions of the second class of instruction to be executed in an order in which a younger instruction is not permitted to bypass an older instruction. In such examples, the first class of instructions may be a class of instructions where out-of-order execution can be particularly beneficial, but it is not worth the additional overhead of a fully out-of-order data processor, i.e. comprising register renaming, re-order buffers, long issue queues, etc. Therefore, similarly to the issue of instructions to the plurality of pipeline stages (i.e. for the first class of instructions), the instructions in the second class of instructions are also issued such that younger instructions are not permitted to bypass an older instruction. This allows for a simpler configuration for the issue circuitry because it simply issues instructions in-order regardless of which class of instruction they are. Then, the above implementation of dynamically allocable execution units may be used for performing the first class of instruction such that a younger instruction is permitted to bypass an older instruction, i.e. out-of-order, under the local control of the scheduling circuitry. Meanwhile, other execution pipelines may continue to operate such that younger instruction are not permitted to bypass an older instruction, i.e. execution of the second class of instructions is in-order (unlike the first class of instructions which permits a limited amount of out-of-order processing). It will be appreciated that some examples of the other execution pipelines may still permit a younger and older instruction to be executed in parallel, since this does not involve the younger instruction bypassing the older instruction.

In some examples, the at least one execution pipeline comprises a plurality of execution pipelines configured to operate in lockstep with each other. This allows for the order of instructions issued to those execution pipelines to be maintained, such that the instructions are retired in the same order. The same lockstep constraint is not required for the plurality of execution units which are capable of executing instructions out-of-order as described above.

In some examples, the plurality of execution units and the at least one execution pipeline are configured to collectively retire instructions in an order in which a younger instruction is not permitted to bypass an older instruction. For example, instructions are retired in program order. This configuration allows for the plurality of pipeline stages processing instructions of the first class to operate locally out-of-order, whereas other execution pipelines processing a second class of instructions may remain in-order, thereby allowing the dynamically allocable execution units handling the first class of instructions to be incorporated into an otherwise in-order data processing apparatus. This means there is no need for a re-order buffer or other complex structure for tracking out-of-order completion of execution, as from the point of view of the pipelines as a whole, the first class of instructions completing in the plurality of pipeline stages are retired in order, and the execution of the first class of instructions is merely re-ordered locally within the pipeline stages comprising the plurality of execution units. This can reduce the circuit area and power overhead of supporting a limited amount of out-of-order execution of instructions, compared to a full out-of-order processor core supporting out-of-order execution across its respective processing pipelines for each class of executed instructions.

In some examples, the plurality of pipeline stages correspond to a fixed number of cycles. In particular, as described above, a pipeline stage may correspond to a predetermined number of cycles after issue in which the instruction is actually executed. Accordingly, issuing an instruction to be executed during the plurality of pipeline stages results in the instruction being executed within the fixed number of cycles, e.g. before or in the cycle corresponding to the final pipeline stage.

In some examples, the fixed number of cycles is equal to a number of cycles for at least one execution pipeline to perform a second class of instruction different to a first class of instruction supported by the plurality of execution units. Accordingly, the constraint of the fixed number of cycles ensures that younger instructions issued to the plurality of pipelines are not permitted to bypass older instructions issued to the at least one execution pipeline, thereby ensuring that both classes of instructions are completed and retired in order from the point of view of the processing circuitry as a whole. Therefore, there is no need for e.g. a reorder buffer for similar reasons as mentioned above.

In some examples, the issue circuitry is responsive to a determination that the instruction cannot be executed within the fixed number of cycles, to cause the instruction to stall. This prevents that instruction from being issued if it would otherwise be completed out-of-order. Therefore, stalling the instruction in such examples maintains the constraint of the fixed number of cycles in the above example. One example scenario in which it is determined that the instruction cannot be executed within the fixed number of cycles is when the input operand data is not yet available, and is not expected to be available within the fixed number of cycles.

Another example scenario for controlling whether or not to issue the instruction includes monitoring a hazarding condition. In particular, the issue circuitry may issue the instruction to be executed in response to a hazarding condition being unsatisfied, i.e. a hazard is not present. It will be appreciated that the issue circuitry may prevent the instruction from being issued in response to a hazarding condition being satisfied, i.e. a hazard is present. The particular types of hazards may vary depending on the particular scenario.

In some examples, the issue circuitry determines whether the hazarding condition is satisfied in dependence on one or more of several different criteria. Firstly, a data hazard may exist between the instruction and another instruction due to, for example, an older instruction being expected to overwrite data that is to be used as an input operand for a younger instruction. Secondly, a number of instructions to be executed in a same cycle may exceed a number of the plurality of execution units. This may particularly occur in implementations where the number of execution units is significantly fewer than S×P as mentioned above. If there is no available execution unit to execute the instruction in the given cycle, then a hazard is detected. Thirdly, one or more input operands to the instruction may be unavailable, for example while they are being fetched from a memory system. Some implementations of the processing circuitry may also risk the occurrence of structural hazards, e.g. where multiple instructions require the use of a single resource simultaneously. It will be appreciated that this list of hazards is not exclusive, and other types of hazards may also be monitored for the purposes of determining whether the hazarding condition is satisfied.

In some examples, the present techniques may be specifically applied where each of the plurality of execution units comprises an arithmetic-logic unit (ALU). It has been found that for some workloads, ALU instructions have relatively shallow data dependencies, which may reduce performance of the processing circuitry when the instructions are constrained to being executed in program order. Accordingly, by using the present techniques to allow ALU instructions to be executed such that younger instructions are permitted to be executed in an order different to a program order, the performance of the processing circuitry can be improved. While the present techniques may be applied to other types of instruction such as multiply-accumulate or division (MAC/DIV), the performance improvement may be less apparent due to such instructions typically having other constraints such as longer data dependencies or requiring more cycles to complete.

In some examples, the execution units are configured to perform one or more of: addition operations, subtraction operations, bitwise shift operations and bitwise logic operations. Therefore, the execution units may be an ALU as above or any kind of dedicated circuitry for performing such operations.

Specific examples are now explained with reference to the drawings.

FIG. 1 schematically illustrates an example of a data processing apparatus 2. The data processing apparatus 2 has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of execution pipelines, for executing different classes of processing operation. For example the execution pipelines may include an arithmetic-logic unit (ALU) pipeline 20 for performing arithmetic or logical operations; a multiply-accumulate/division (MAC/DIV) pipeline 24 for performing multiplication and division operations; and a load/store pipeline 28 for performing load/store operations to access data in a memory system 8, 30, 32, 34. In this example the memory system includes a level one data cache 30, the level one instruction cache 8, a shared level two cache 32 and main system memory 34. It will be appreciated that this is just one example of a possible memory hierarchy and other arrangements of caches can be provided. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

The specific types of execution pipelines 20 to 28 shown in the execute stage 16 are just one example, and other implementations may have a different set of execution pipelines. Furthermore, although only one of each type of execution pipeline has been illustrated in FIG. 1 for clarity, it will be appreciated that the execute stage 16 may include a plurality of instances of the same type of execution pipeline. Furthermore, as will be described in the following examples, the execute stage 16 includes a plurality of instances of at least one type of execution unit arranged into a plurality of pipeline stages of a given execution pipeline. Purely for conciseness, the following examples will refer the ALU pipeline 20 as such an execution pipeline comprising a plurality of individual ALUs, but it will be appreciated that the present techniques may be applied to other types of execution pipeline as well.

Figure 2:
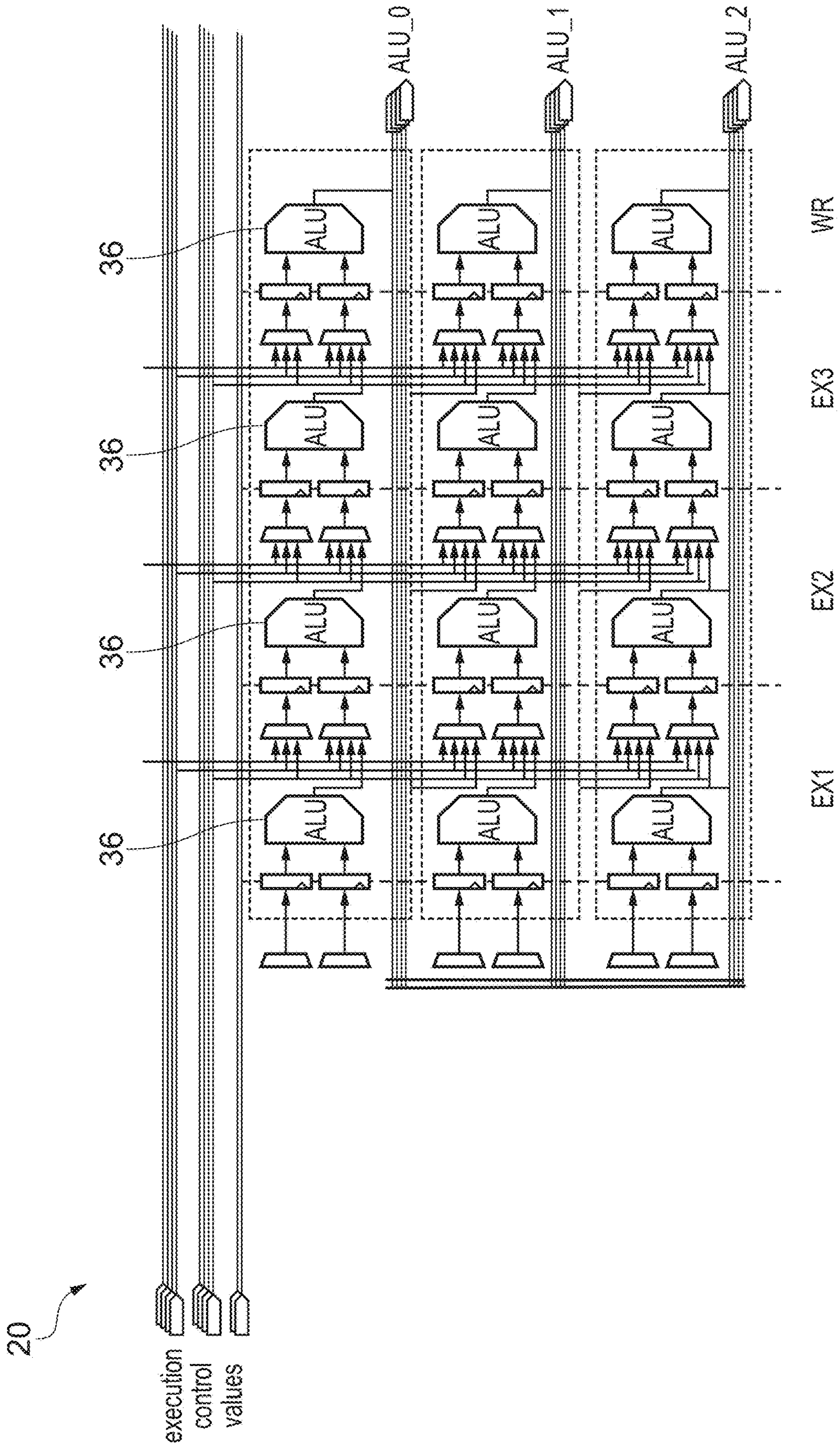
FIG. 2 illustrates an example of pipeline stages with clocked register stages between each pipeline stage.

FIG. 2 illustrates one approach to arranging a plurality of ALUs 36 into a plurality of pipeline stages implementing a total of 12 ALUs 36. In this example, the ALUs 36 are arranged into a superscalar pipeline with three parallel issue slots (ALU_0, ALU_1 and ALU_2) each comprising 4 pipeline stages (EX1, EX2, EX3 and WR). A set of storage elements are provided for storing intermediate results such as input operands for the following pipeline stage or output operands from the previous pipeline stage. Additional execution control bits may also be input at various pipeline stages for further controls on how execution is handled. An instruction issued by the issue stage 12 is issued to be executed in a particular pipeline stage, for example in EX2. The instruction information (e.g. an opcode, input operand data, etc) is received at EX1 and then passed to EX2 where the ALU 36 in EX2 then executes the instruction to generate output operands. Those output operands are then passed through EX3 until WR, to generate an output of the execution pipeline to be written back to the register file 14 via the writeback stage 18. By using this arrangement, an instruction may be issue for execution in a later pipeline stage, e.g. EX3, even though the operands are not available at issue-time. However, the issue circuitry 12 may expect that the operands will become available by the cycle corresponding to EX3, e.g. due to execution of an earlier instruction in an earlier pipeline stage, e.g. EX2, producing the operand to be used in EX3. Accordingly, the issue stage 12 may issue the instructions to be executed sooner or later in the pipeline, while maintaining that instructions are issued in an order in which younger instructions are not permitted to bypass older instructions.

For some workloads, there is frequently fewer in-flight instructions (i.e. instructions that have been issued but not yet completed) than there are ALUs 36. Hence, a problem for the arrangement of FIG. 2 is that there may be fewer than 12 in-flight instructions, resulting in some of the ALUs 36 not actually executing an instruction in a given cycle. Those unused ALUs 36 therefore increase power consumption and circuit area without providing a benefit to performance in that given cycle.

Figure 3:
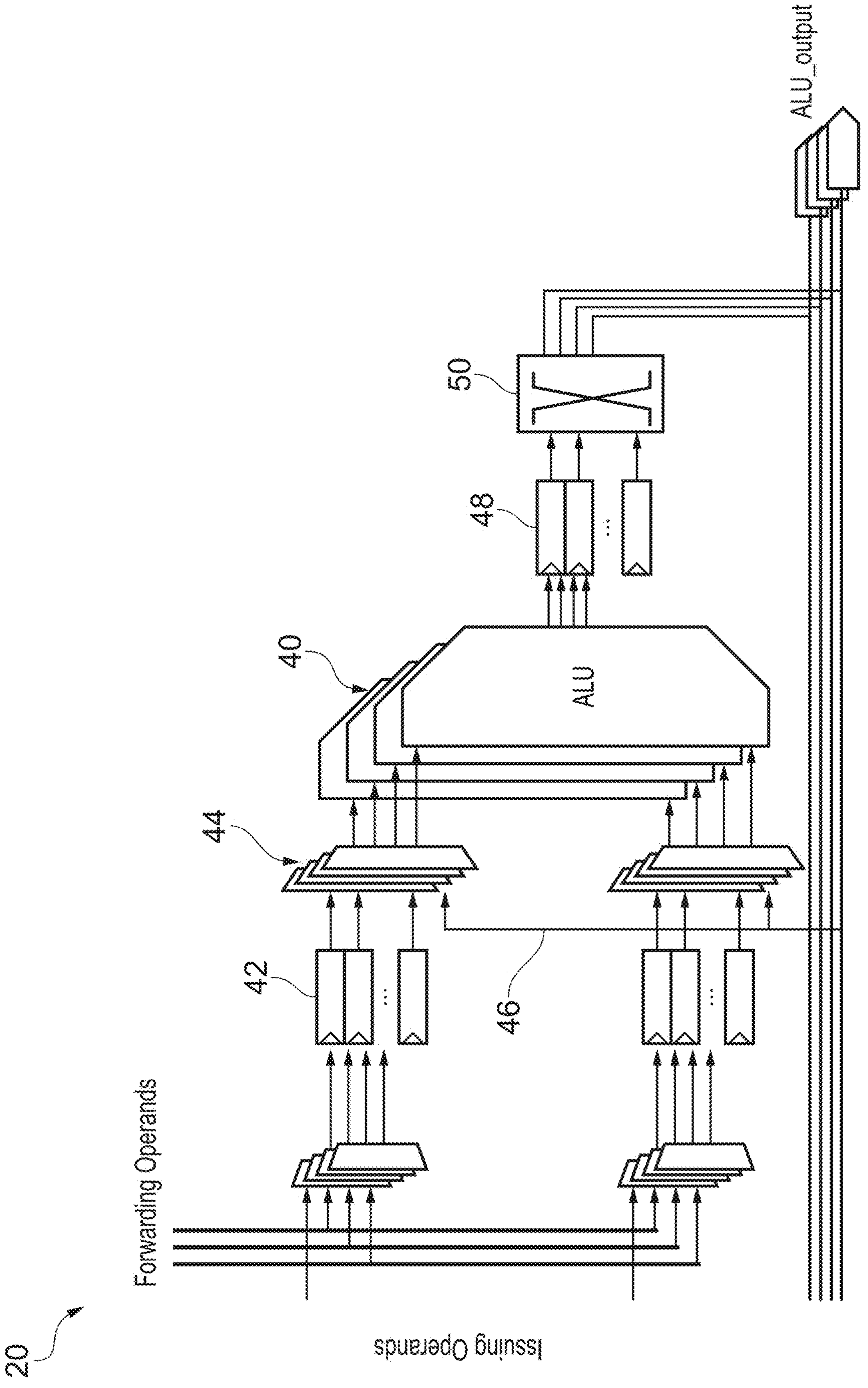
FIG. 3 illustrates an example configuration for dynamically allocating execution units to pipeline stages.

FIG. 3 illustrates an example according to the present techniques for arranging a plurality of ALUs to operate as a plurality of pipeline stages. In contrast to the arrangement in FIG. 2, the present techniques provide a single pooled stage 40 comprising a plurality of ALUs. Each ALU in the pooled stage 40 is capable of being dynamically allocated to execute any issued instruction in a given cycle without having to wait for the instruction information to move through the pipeline. Instead, the instruction may be executed in response to the input operand data being available, which thereby allows for instructions to be executed in an order different to the program order. For this purpose, the data processing apparatus 2 of FIG. 1 further comprises a schedule stage 26 coupled with the ALU pipeline 20, which schedules the instructions to be executed in a given cycle after having been issued by the issue stage 12. In particular, the schedule stage 26 is configured to dynamically allocate which of the plurality of pipeline stages a given ALU is assigned to in the given cycle, thereby allowing the arrangement of FIG. 2 to be effectively emulated. The schedule stage 26 therefore selects a configuration for a given cycle such that an ALU may be assigned to any pipeline stage as is required. Therefore, a pipeline stage that would otherwise be unused may not have an ALU assigned at all. This more efficient utilisation of the available ALUs therefore enables the pooled stage 40 to handle a larger number of in-flight instructions and/or contain fewer ALUs than the equivalent pipeline stages of FIG. 2. A set of storage elements 42 is provided for storing input operands to the pooled stage 40 and may selectively hold operands for one or more cycles until the relevant instruction is scheduled for execution by the pooled stage 40. The operands held in the storage elements 42 may be selectively input into an ALU of the pooled stage 40 by scheduling logic 44, which may be part of or controlled by the schedule stage 26.

Where an instruction is issued to be executed, the issuing operands (e.g. operands in an instruction) and forwarding operands (e.g. operands from the register file 14) are written into the storage elements as input operand data for executing the instructions. The schedule stage 26 can then select a configuration to assign one of the ALUs in the pooled stage 40 to the pipeline stage for executing the instruction and controls the scheduling logic 44 to input the necessary operands into the assigned ALU for the instruction to be executed. The output operands are then written to the storage elements 48.

With this arrangement, instructions issued for execution at a later pipeline stage may (with the availability of input operands permitting) be input to the pooled stage 40 earlier than the cycle corresponding to the later pipeline stage, instead of waiting for older instructions to be executed first. Accordingly, the pooled stage 40 may locally operate out-of-order even in examples where the data processing apparatus 2 is configured as an in-order machine, i.e. such that younger instructions are not permitted to be issued before older instructions by the issue stage 12. Re-order circuitry 50 may be provided to selectively output the output operands as ALU_output, i.e. an output of the execute stage 16, such that they are output in program order. Additionally, the output operands may also be input back into the pooled stage 40 via the data loop 46 so that they can be used in a subsequent pipeline stage as an input operand for another instruction.

Also with this arrangement, fewer ALUs are required in order to maintain a similar throughput of instructions as the arrangement of FIG. 2. In particular, any of the ALUs in the pooled stage 40 may be used to emulate the ALUs that are actually in use in the given cycle whereas ALUs that would otherwise not be used may be omitted altogether. Accordingly, in the example of FIG. 3, there are only 4 ALUs, thereby reducing circuit area and power consumption while maintaining the same instruction throughput for some workloads. It will be appreciated that any number of ALUs could be implemented with the benefit of reduced circuit area and power consumption being achieved by any number below S×P, where S represents a number of the plurality of pipeline stages (i.e. 12 in FIG. 2) and P represents a maximum number of instructions that the issue stage 12 is configured to issue in a single cycle (i.e. 3 in FIG. 2). Alternatively, the same number of ALUs may be implemented in order to make better use of the out-of-order capabilities of the pooled stage 40 in order to further improve instruction throughput.

Figure 4A:
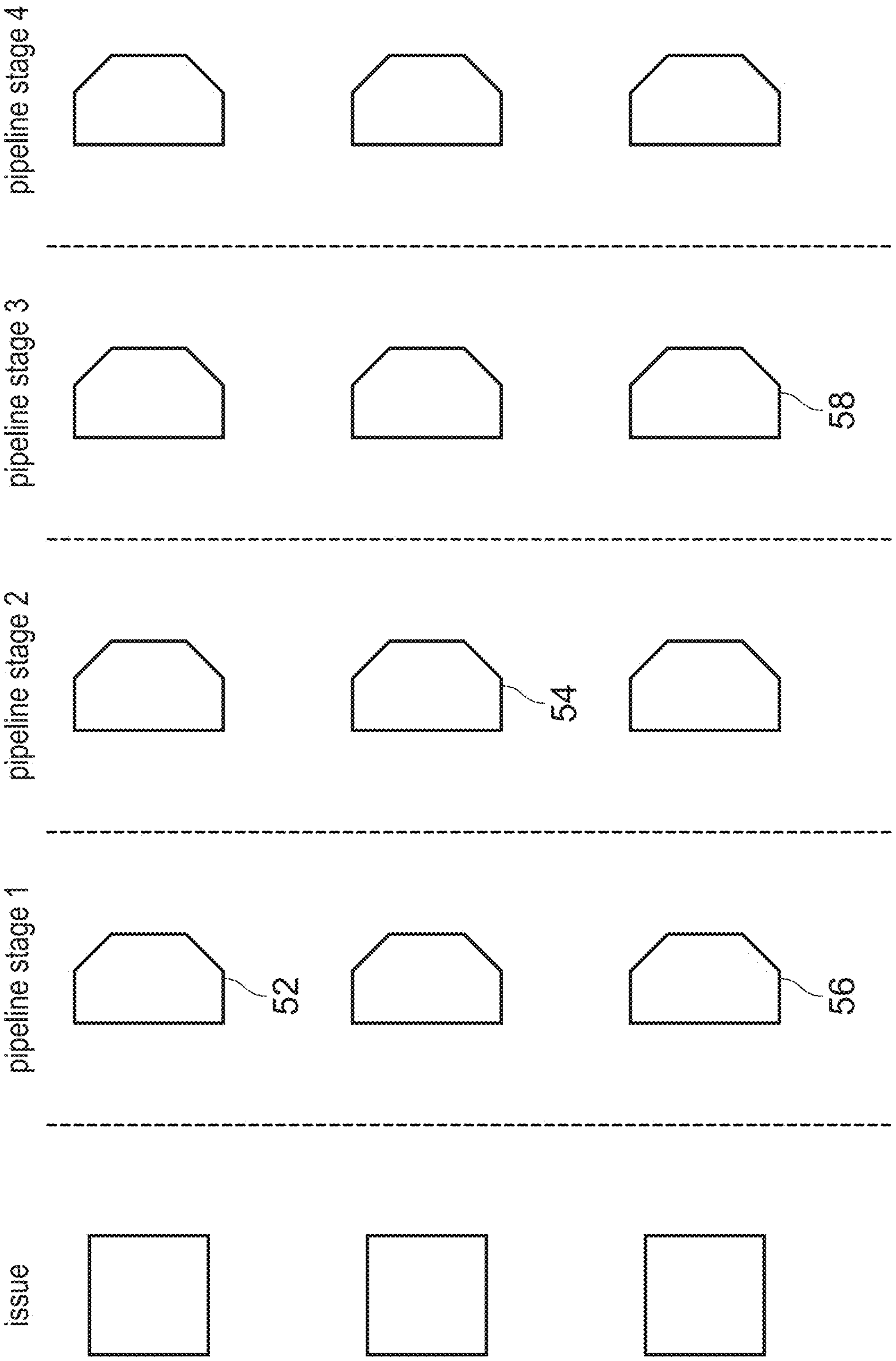
FIGS. 4A and 4B illustrate a simplified view of pipeline stages, and an example allocation of execution units to some of the pipeline stages.
Figure 4B:
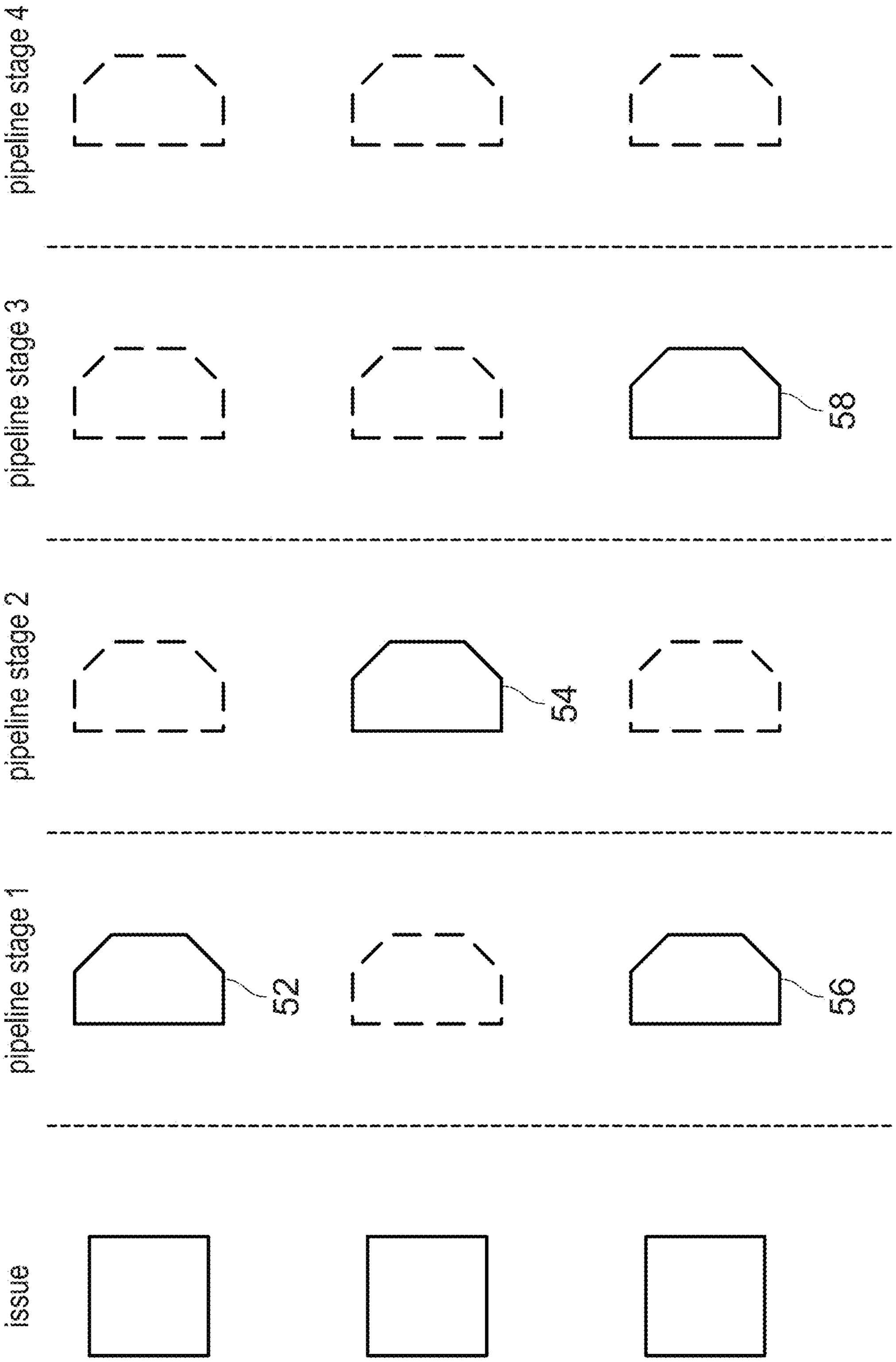

To illustrate how the arrangement of FIG. 3 may be used to emulate the arrangement of FIG. 2, a simplified illustration of the plurality of pipeline stages of FIG. 2 is shown in FIG. 4A with 3 pipelines, each comprising four pipeline stages. In this example, the issue stage 12 has recently issued four instructions for execution in the pipeline stages 52, 54, 56 and 58. It will be appreciated therefore, that other pipeline stages are not in use in the cycle in which these instructions are executed. Accordingly, the schedule stage 26 may dynamically allocate each of the four available ALUs in the pooled stage 40 such that an ALU is assigned to each of the pipeline stages 52, 54, 56 and 58 for the cycle. FIG. 4B illustrates the configuration of ALUs selected by the schedule stage 26. ALUs have been assigned to the pipeline stages 52, 54, 56, 58 (shown in solid lines) while other pipeline stages do not have an ALU assigned (shown in dashed lines). Using the scheduling logic 44 described above, the pooled stage 40 can then execute the instructions in the cycle. As mentioned above, the present technique means that eight ALUs that would otherwise be unused in the cycle can be omitted from the implementation entirely, thereby reducing circuit area and power consumption.

It will be appreciated that the assignment shown in FIG. 4B is for the particular example of instructions being issued for execution in those pipeline stages. In other scenarios where instructions are issued for execution in different pipeline stages, the ALUs from the pooled stage 40 may be dynamically allocated differently by the schedule stage 26. As a result, the present techniques provide flexibility regarding which ALUs are used to emulate various pipeline stages.

Figure 5:
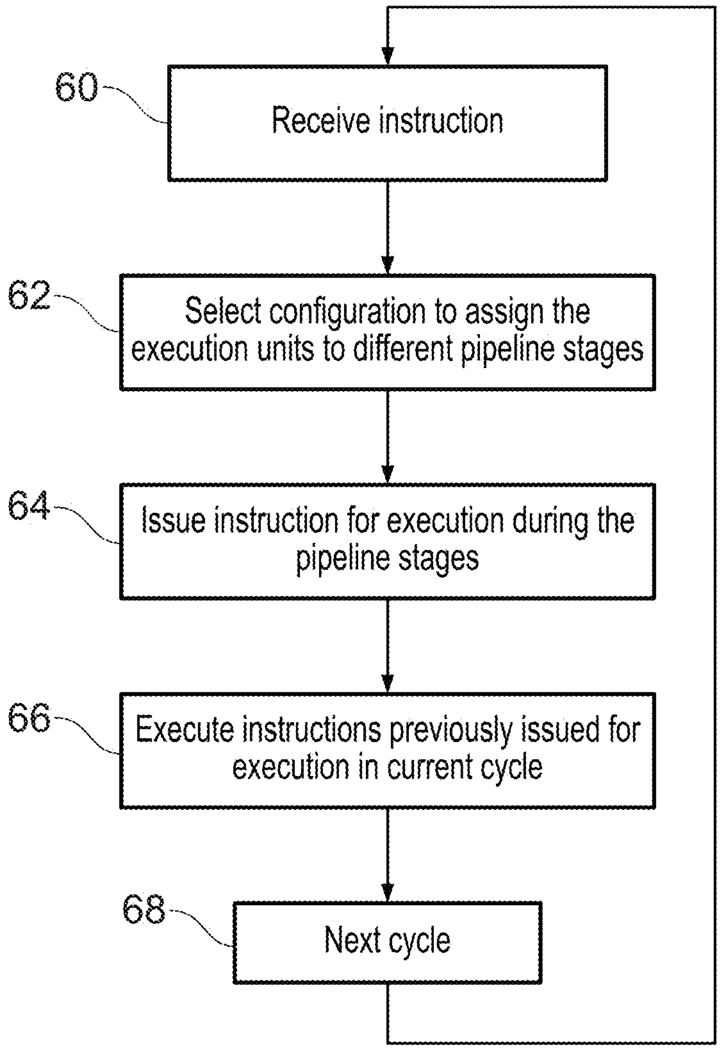
FIG. 5 illustrates a sequence of steps for allocating execution units for executing instructions.

FIG. 5 illustrates a sequence of steps for implementing the present techniques. At step 60, an instruction received for example by the decode stage 10. At step 62, a configuration for assigning the execution units, e.g. the ALUs, to different pipeline stages is selected for the current cycle. The selection may be based on the instructions that have been issued in previous cycles, and in which pipeline stages they were issued for execution. At step 64, an instruction is issued for execution during the pipeline stages by the issue stage 12. In some examples, step 64 may involve a plurality of instructions being issued for execution in parallel. In step 66, the instructions that have been previously issued are executed by the execution units according to the configuration selected in step 62. The process then proceeds to the next cycle at step 68 and repeats from step 60.

As mentioned above, the present techniques may be used to incorporate local out-of-order execution for one type of execution pipeline while other types of execution pipelines maintain in-order execution. The scheduling stage 26 may select configurations (e.g. in step 62) based on the scheduled order that is different to the order in which the instructions are issued. For example, the scheduling stage 26 may determine when operands of various instructions are expected to be produced and/or consumed. The order may then be scheduled on that basis, such that instructions that have respective input operand data available sooner can be scheduled for execution sooner, and vice versa for instructions that have respective input operand data available later. In some examples, the plurality of pipelines to which the present techniques are applied may be configured to execute one class of instructions, whereas the other in-order pipelines execute a different class of instructions.

Figure 6:
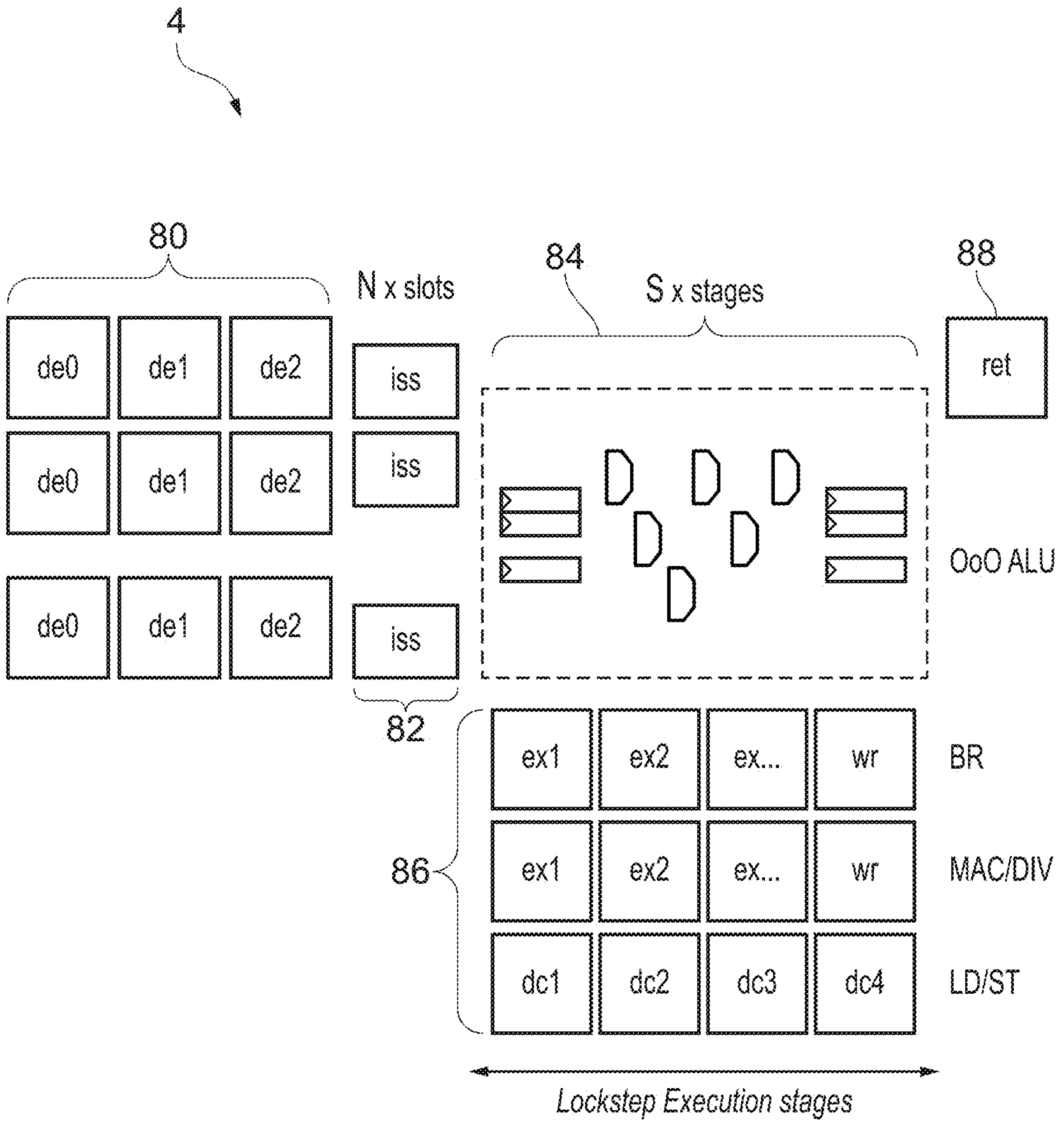
FIG. 6 illustrates an example comprising a dynamically allocable pipeline for one class of instruction, and other pipelines for another class of instruction.

FIG. 6 illustrates an example of a processing pipeline 4 incorporating the present techniques applied in a superscalar arrangement. The processing pipeline 4 comprises the decode stage 80 which includes a plurality of individual instruction decoders (de0, de1, de2). The instruction decoders operate in parallel to provide a number of parallel streams of decoded instructions to be issued by the issue stage 82. The issue stage 82 comprises N slots (N=3 in this example), where each slot can be used to issue an instruction to the execute stages in each cycle.

The execute stages comprise an out-of-order pipeline 84 for one class of instruction and one or more in-order pipelines 86 for another class of instruction, where each pipeline includes S pipeline stages (S=4 in this example). In this example, the out-of-order pipeline 84 comprises the dynamically allocable ALUs as described in previous examples, which are each configured to execute ALU instructions (e.g. involving the performance of addition operations, subtraction operations, bitwise shift operations and bitwise logic operations). The in-order pipelines 86 are configured to execute branch instructions, multiply-accumulate and division instructions, and load/store instructions respectively. As mentioned previously, it will be appreciated that the arrangement of FIG. 6 is just one example, and the pipelines may be differently arranged such that, for example the ALUs are one of the in-order pipelines, and the MAC/DIV pipeline comprises the dynamically allocable execution units.

After the execute stages is the instruction retirement stage 88, which is configured to collectively retire the instructions from each pipeline in an order in which a younger instruction is not permitted to bypass an older instruction. To maintain this order, the execution stages are configured to execute the instructions within a certain latency of each other. For the in-order pipelines 86, this can be achieved by causing the in-order pipelines 86 to operate in lockstep with each other. For the out-of-order pipeline 84 to maintain the same order, a fixed latency is imposed so that the out-of-order pipeline 84 completes an instruction in a fixed number of cycles after the instruction is issued. The fixed latency may be equal to a number of cycles for one of the other in-order execution pipelines 86 to execute an instruction. If it is determined that the out-of-order pipeline 84 cannot execute an instruction within that fixed latency, for example due to a hazard, the entire processing pipeline 4 may be stalled until the instruction can be executed. Accordingly, each of the execution stages will execute the instructions such that they may be collectively retired in-order by the retirement stage 88. This means that the additional structures of fully out-of-order processors, e.g. re-order buffers, are not necessary for the present techniques.

Figure 7:
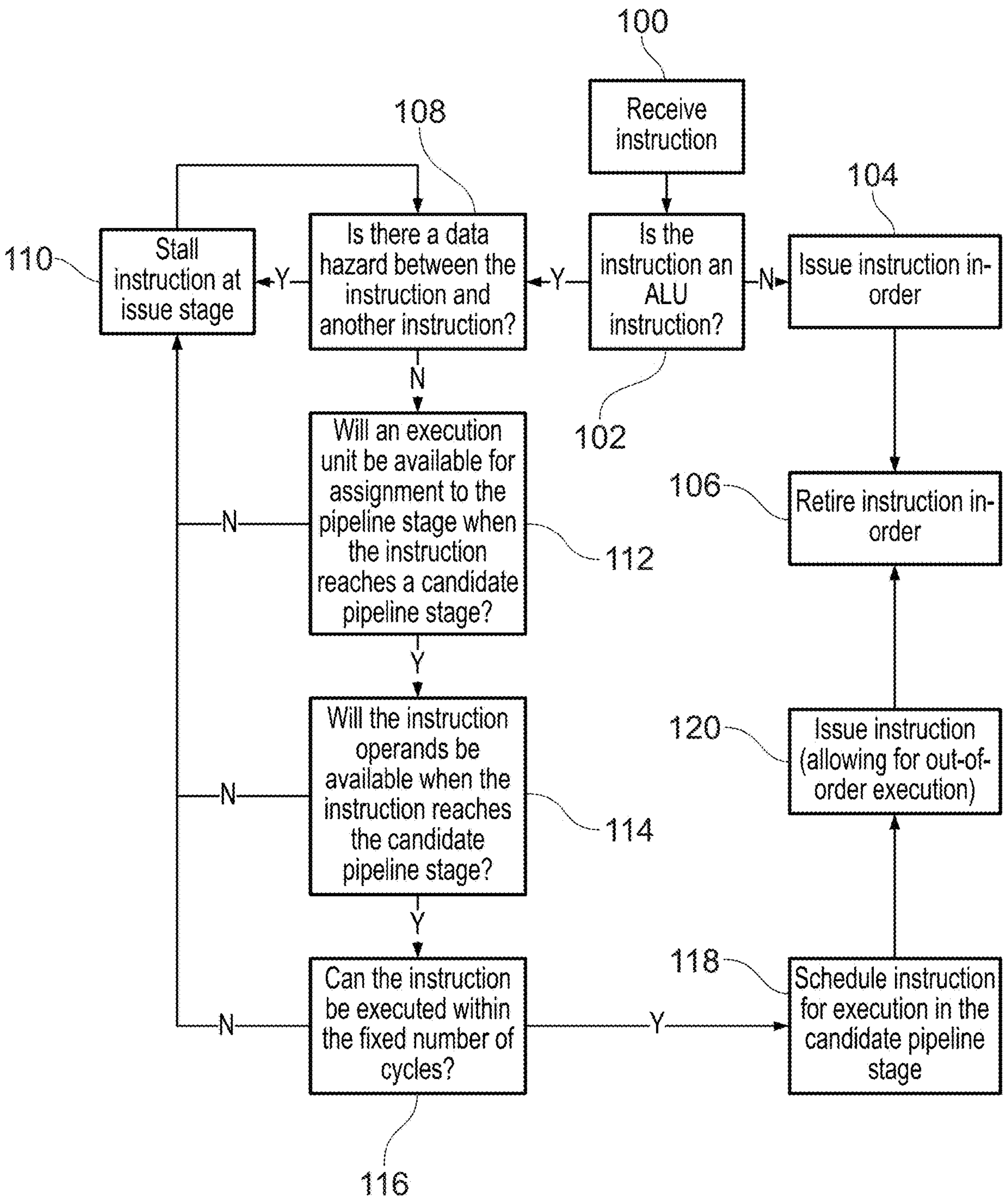
FIG. 7 illustrates a sequence of steps for executing instructions of different classes.

FIG. 7 illustrates a sequence of steps for operating the processing pipeline 4 of FIG. 6. The process begins with receiving an instruction at step 100. It is then determined whether the instruction is an ALU instruction at step 102. It will be appreciated that for examples where the present techniques are applied to a different type of execution unit, then step 102 will be to determine whether the instruction is the type of instruction executed by that type of execution unit. If the instruction is not an ALU instruction, then the instruction is issued in-order to the in-order pipelines 86 at step 104. After the instruction has been executed, the instruction is retired in-order by the retirement stage 88.

If the instruction is an ALU instruction, then at step 108, it is determined whether there is a data hazard between the instruction and another instruction. One example of such a data hazard is a read-after-write hazard, where a younger instruction is to read a data value that is expected to be overwritten by an older instruction. If a data hazard is present, then the instruction is stalled at the issue stage 82 at step 110. This may cause the entire processing pipeline 4 to also stall to maintain in-order execution.

If there is no data hazard, then at step 112 it is determined whether there is an execution unit (e.g. an ALU) available that can be assigned to the pipeline stage when the instruction reaches a candidate pipeline stage. The candidate pipeline stage refers to the pipeline stage in which the instruction could be issued to execute. Using the example of FIG. 3, if the instruction reaches the candidate pipeline stage in a cycle where 5 or more instructions are to be executed, then a structural hazard is present because there are only 4 ALUs that can be assigned. In this scenario, there will not be an execution unit available that can be assigned to the candidate pipeline stage, and the instruction is then stalled at the issue stage 82 at step 110 so that another candidate pipeline stage can be checked. It will be understood that this is but one example of a structural hazard that is of note when using the present techniques, but other structural hazards may also occur in the processing circuitry that may require one or more instructions to stall.

If there is no structural hazard, then at step 114 it is determined whether the instruction operands will be available when the instruction reaches the candidate pipeline stage. This does not necessarily require that the operands are available at the point of issue. For example, one operand may be the result of a preceding instruction, in which case that operand will be available, even though that preceding instruction has not been executed yet. If the instruction operands will not be available, then the instruction is stalled at step 110 to allow for more time for the operands to become available.

At step 116, it is verified whether the instruction can be executed within the fixed number of cycles, e.g. corresponding to the number of cycles required for the other execution pipelines to complete an instruction. If not, then the instruction is stalled at step 110.

It will be appreciated that any of steps 108, 112, 114 and 116 may be performed in any order or simultaneously. It is not necessary that all of the hazards are monitored and some implementations may be more tolerant of executing an instruction without checking for hazards. While an instruction is stalled at step 110, any of steps 108, 112, 114 and 116 may be re-performed to verify whether the hazard is still present or whether the hazard has cleared. If all hazards are eventually cleared (i.e. Y at step 116), then the instruction can be scheduled for execution in the candidate pipeline stage at step 118 and the instruction can be issued for execution by the out-of-order pipeline 84 at step 120. After the instruction has been executed at the candidate pipeline stage using a dynamically assigned execution unit, the instruction is then retired in-order with the other non-ALU instructions that were issued and executed in step 104.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 8:
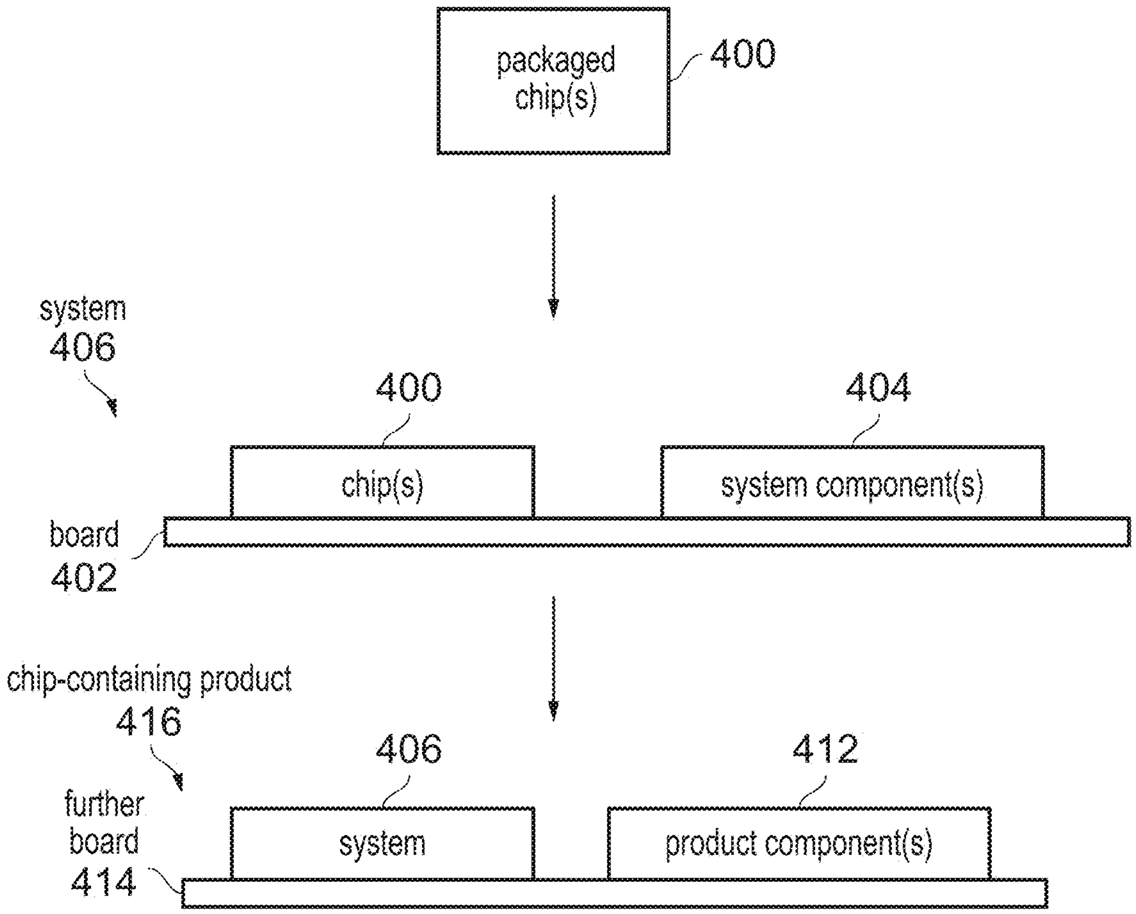
FIG. 8 illustrates a system and a chip-containing product.

As shown in FIG. 8, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus comprising:

processing circuitry comprising a plurality of execution units;

issue circuitry configured to issue an instruction to be executed by the processing circuitry during a plurality of pipeline stages such that younger instructions are not permitted to be issued before older instructions; and scheduling circuitry configured to schedule instructions to be executed in a given cycle during the plurality of pipeline stages, such that the instruction is permitted to be executed in an order different to a program order in response to input operand data being available, by dynamically allocating which of the plurality of pipeline stages a given execution unit of the plurality of execution units is assigned to in the given cycle, wherein:

in a first configuration selectable for the given cycle, the scheduling circuitry is configured to cause the given execution unit of the plurality of execution units to be assigned to a first pipeline stage of the plurality of pipeline stages; and in a second configuration selectable for the given cycle, the scheduling circuitry is configured to cause the given execution unit to be assigned to a second pipeline stage of the plurality of pipeline stages.

(2) The apparatus of clause (1), wherein the issue circuitry is configured to issue a plurality of instructions in parallel.

(3) The apparatus of clause (2), wherein the plurality of execution units comprises fewer than S×P execution units, wherein S represents a number of the plurality of pipeline stages and P represents a maximum number of instructions that the issue circuitry is configured to issue in a single cycle.

(4) The apparatus of any preceding clause, wherein the plurality of pipeline stages are arranged as a single pooled stage; and the scheduling circuitry is configured to cause the instruction to be executed by the pooled stage in the given cycle based on a selected configuration.

(5) The apparatus of clause (4), wherein the processing circuitry comprises a set of storage elements configured to store input operands and output operands between each of the plurality of pipeline stages.

(6) The apparatus of clause (5), wherein the single pooled stage is configured to read input operands and write output operands in the same set of storage elements in each cycle.

(7) The apparatus of clause (5) or clause (6), wherein the set of storage elements is configured to selectively hold an operand for at least one cycle.

(8) The apparatus of any preceding clause, wherein the plurality of execution units are configured to perform a first class of instruction; and the processing circuitry comprises at least one execution pipeline configured to perform a second class of instruction.

(9) The apparatus of clause (8), wherein the issue circuitry is configured to issue instructions of the second class of instruction to be executed in an order in which a younger instruction is not permitted to bypass an older instruction.

(10) The apparatus of clause (8) or clause (9), comprising wherein the at least one execution pipeline comprises a plurality of execution pipelines configured to operate in lockstep with each other.

(11) The apparatus of any of clauses (8) to (10), wherein the plurality of execution units and the at least one execution pipeline are configured to collectively retire instructions in an order in which a younger instruction is not permitted to bypass an older instruction.

(12) The apparatus of any preceding clause, wherein the plurality of pipeline stages correspond to a fixed number of cycles.

(13) The apparatus of clause (12), wherein the fixed number of cycles is equal to a number of cycles for at least one execution pipeline to perform a second class of instruction different to a first class of instruction supported by the plurality of execution units.

(14) The apparatus of clause (12) or clause (13), wherein the issue circuitry is responsive to a determination that the instruction cannot be executed within the fixed number of cycles, to cause the instruction to stall.

(15) The apparatus of clause (14), wherein the issue circuitry is configured to issue the instruction to be executed in response to a hazarding condition being unsatisfied.

(16) The apparatus of clause (15), wherein the issue circuitry is configured to determine whether the hazarding condition is satisfied in dependence on any one or more of:

a data hazard existing between the instruction and another instruction;

a number of instructions to be executed in a same cycle exceeding a number of the plurality of execution units;

one or more input operands to the instruction being unavailable; and a structural hazard existing in the processing circuitry.

(17) The apparatus of any preceding clause, wherein each of the plurality of execution units comprises an arithmetic-logic unit.

(18) The apparatus of any preceding clause, wherein the plurality of execution units are configured to perform one of more of: addition operations, subtraction operations, bitwise shift operations and bitwise logic operations.

(19) A system comprising:

the apparatus of any preceding clause, implemented in at least one packaged chip;

at least one system component; and a board, wherein the at least one packaged chip and the at least one system component are assembled on the board.

(20) A chip-containing product comprising the system of clause (19), wherein the system is assembled on a further board with at least one other product component.

(21) A method comprising:

issuing an instruction to be executed during a plurality of pipeline stages such that younger instructions are not permitted to be issued before older instructions; and scheduling instructions to be executed in a given cycle during the plurality of pipeline stages, such that the instruction is permitted to be executed in an order different to a program order in response to respective input operand data being available, by dynamically allocating which of the plurality of pipeline stages a given execution unit of a plurality of execution units is assigned to in the given cycle, wherein:

in a first configuration selectable for the given cycle, causing the given execution unit of the plurality of execution units to be assigned to a first pipeline stage of the plurality of pipeline stages; and in a second configuration selectable for the given cycle, causing the given execution unit to be assigned to a second pipeline stage of the plurality of pipeline stages.

(22) A non-transitory computer-readable medium storing computer-readable code for fabrication of an apparatus comprising:

processing circuitry comprising a plurality of execution units;

issue circuitry configured to issue an instruction to be executed by the processing circuitry during a plurality of pipeline stages such that younger instructions are not permitted to be issued before older instructions; and scheduling circuitry configured to schedule instructions to be executed in a given cycle during the plurality of pipeline stages, such that the instruction is permitted to be executed in an order different to a program order in response to respective input operand data being available, by dynamically allocating which of the plurality of pipeline stages a given execution unit of the plurality of execution units is assigned to in the given cycle, wherein:

in a first configuration selectable for the given cycle, the scheduling circuitry is configured to cause the given execution unit of the plurality of execution units to be assigned to a first pipeline stage of the plurality of pipeline stages; and in a second configuration selectable for the given cycle, the scheduling circuitry is configured to cause the given execution unit to be assigned to a second pipeline stage of the plurality of pipeline stages.

In the present application, the words "configured to." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry comprising a plurality of execution units;

issue circuitry configured to issue an instruction to be executed by the processing circuitry in a plurality of pipeline stages such that younger instructions are not permitted to be issued before older instructions; and scheduling circuitry configured to schedule instructions to be executed in a given cycle in the plurality of pipeline stages, such that the instruction is permitted to be executed in an order different to a program order in response to input operand data being available, by dynamically allocating which of the plurality of pipeline stages a given execution unit of the plurality of execution units is assigned to in the given cycle, wherein:

in a first configuration selectable for the given cycle, the scheduling circuitry is configured to cause the given execution unit of the plurality of execution units to be assigned to a first pipeline stage of the plurality of pipeline stages; and in a second configuration selectable for the given cycle, the scheduling circuitry is configured to cause the given execution unit to be assigned to a second pipeline stage of the plurality of pipeline stages.

2. The apparatus of claim 1, wherein the issue circuitry is configured to issue a plurality of instructions in parallel.

3. The apparatus of claim 2, wherein the plurality of execution units comprises fewer than S×P execution units, wherein S represents a number of the plurality of pipeline stages and P represents a maximum number of instructions that the issue circuitry is configured to issue in a single cycle.

4. The apparatus of claim 1, wherein the plurality of pipeline stages are arranged as a single pooled stage; and the scheduling circuitry is configured to cause the instruction to be executed by the pooled stage in the given cycle based on a selected configuration.

5. The apparatus of claim 4, wherein the processing circuitry comprises a set of storage elements configured to store input operands and output operands between each of the plurality of pipeline stages.

6. The apparatus of claim 5, wherein the single pooled stage is configured to read input operands and write output operands in the same set of storage elements in each cycle.

7. The apparatus of claim 5, wherein the set of storage elements is configured to selectively hold an operand for at least one cycle.

8. The apparatus of claim 1, wherein the plurality of execution units are configured to perform a first class of instruction; and the processing circuitry comprises at least one execution pipeline configured to perform a second class of instruction.

9. The apparatus of claim 8, wherein the issue circuitry is configured to issue instructions of the second class of instruction to be executed in an order in which a younger instruction is not permitted to bypass an older instruction.

10. The apparatus of claim 8, comprising wherein the at least one execution pipeline comprises a plurality of execution pipelines configured to operate in lockstep with each other.

11. The apparatus of claim 8, wherein the plurality of execution units and the at least one execution pipeline are configured to collectively retire instructions in an order in which a younger instruction is not permitted to bypass an older instruction.

12. The apparatus of claim 1, wherein the plurality of pipeline stages correspond to a fixed number of cycles.

13. The apparatus of claim 12, wherein the fixed number of cycles is equal to a number of cycles for at least one execution pipeline to perform a second class of instruction different to a first class of instruction supported by the plurality of execution units.

14. The apparatus of claim 12, wherein the issue circuitry is responsive to a determination that the instruction cannot be executed within the fixed number of cycles, to cause the instruction to stall.

15. The apparatus of claim 14, wherein the issue circuitry is configured to issue the instruction to be executed in response to a hazarding condition being unsatisfied.

16. The apparatus of claim 15, wherein the issue circuitry is configured to determine whether the hazarding condition is satisfied in dependence on any one or more of:

a data hazard existing between the instruction and another instruction;

a number of instructions to be executed in a same cycle exceeding a number of the plurality of execution units;

one or more input operands to the instruction being unavailable; and a structural hazard existing in the processing circuitry.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A method comprising:

issuing an instruction to be executed in a plurality of pipeline stages such that younger instructions are not permitted to be issued before older instructions; and scheduling instructions to be executed in a given cycle in the plurality of pipeline stages, such that the instruction is permitted to be executed in an order different to a program order in response to respective input operand data being available, by dynamically allocating which of the plurality of pipeline stages a given execution unit of a plurality of execution units is assigned to in the given cycle, wherein:

in a first configuration selectable for the given cycle, causing the given execution unit of the plurality of execution units to be assigned to a first pipeline stage of the plurality of pipeline stages; and in a second configuration selectable for the given cycle, causing the given execution unit to be assigned to a second pipeline stage of the plurality of pipeline stages.

20. A non-transitory computer-readable medium storing computer-readable code for fabrication of an apparatus comprising:

processing circuitry comprising a plurality of execution units;

issue circuitry configured to issue an instruction to be executed by the processing circuitry in a plurality of pipeline stages such that younger instructions are not permitted to be issued before older instructions; and scheduling circuitry configured to schedule instructions to be executed in a given cycle in the plurality of pipeline stages, such that the instruction is permitted to be executed in an order different to a program order in response to respective input operand data being available, by dynamically allocating which of the plurality of pipeline stages a given execution unit of the plurality of execution units is assigned to in the given cycle, wherein:

in a first configuration selectable for the given cycle, the scheduling circuitry is configured to cause the given execution unit of the plurality of execution units to be assigned to a first pipeline stage of the plurality of pipeline stages; and in a second configuration selectable for the given cycle, the scheduling circuitry is configured to cause the given execution unit to be assigned to a second pipeline stage of the plurality of pipeline stages.

* * * * *